(12) United States Patent
Chen et al.

(10) Patent No.: US 10,104,651 B2
(45) Date of Patent: Oct. 16, 2018

(54) PHYSICAL DOWNLINK CONTROL CHANNEL DESIGN FOR NARROW BAND INTERNET OF THINGS

(71) Applicant: MEDIATEK INC., Hsinchu (TW)

(72) Inventors: Po-Ying Chen, Hsinchu (TW);
Xiu-Sheng Li, Hsinchu (TW);
Kuhn-Chang Lin, Chiayi (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/379,765

(22) Filed: Dec. 15, 2016

(65) Prior Publication Data
US 2017/0181135 A1    Jun. 22, 2017

Related U.S. Application Data

(60) Provisional application No. 62/268,600, filed on Dec. 17, 2015.

(51) Int. Cl.
*H04W 72/04*    (2009.01)
*H04L 5/00*    (2006.01)
(Continued)

(52) U.S. Cl.
CPC ......... *H04W 72/042* (2013.01); *H04L 5/0048* (2013.01); *H04W 48/16* (2013.01);
(Continued)

(58) Field of Classification Search
CPC ..... H04W 4/005; H04W 88/08; H04W 88/02; H04W 48/16; H04W 72/042;
(Continued)

(56) References Cited

U.S. PATENT DOCUMENTS 9,801,115 B2 *   10/2017   Sadek ................... H04W 40/16
9,887,822 B2 *    2/2018   Xiong ................... H04L 5/0055
(Continued)

OTHER PUBLICATIONS

EPO, Search Report for the EP patent application 16204797.1 dated May 8, 2017 (12 pages).
(Continued)

*Primary Examiner* — Jung Liu
(74) *Attorney, Agent, or Firm* — Imperium Patent Works; Zheng Jin

(57) ABSTRACT

Narrowband downlink control channel (NB-PDCCH) design for Narrowband Internet of Thing (IoT) devices is proposed. In one novel aspect, NB-PDCCH spans both first and second slots in the region of legacy physical downlink shared channel (PDSCH). A plurality of physical resource blocks (PRBs) is allocated for NB-PDCCH transmission that carry downlink control information (DCI). Furthermore, each NB-IoT device can be configured with $n_{PRB}$ PRB pairs for NB-PDCCH transmission (e.g., $n_{PRB}$=1, 2, 4, or 8), and an NB-PDCCH transmission time interval (TTI) is composed by $n_{PRB}$ subframes. An NB-PDCCH is encoded and occupies multiple narrowband control channel elements (NCCEs) based on aggregation level. In a preferred embodiment, each PRB pair for NB-PDCCH occupies two NCCEs.

17 Claims, 5 Drawing Sheets

(51) Int. Cl.
*H04W 48/16* (2009.01)
*H04W 88/02* (2009.01)
*H04W 88/08* (2009.01)

(52) U.S. Cl.
CPC ........ *H04W 72/0453* (2013.01); *H04W 88/02* (2013.01); *H04W 88/08* (2013.01)

(58) Field of Classification Search
CPC .......... H04W 72/0453; H04W 64/006; H04W 68/02; H04W 72/048; H04L 5/0051; H04L 5/0048; H04L 5/0064; H04L 5/0092; H04L 5/0053; H04L 5/0005
See application file for complete search history.

(56) References Cited

U.S. PATENT DOCUMENTS

| | | | |
|---|---|---|---|
| 2013/0094457 A1 | 4/2013 | Seo et al. .................. | 370/329 |
| 2013/0100900 A1 | 4/2013 | Lee et al. .................. | 370/329 |
| 2015/0063148 A1* | 3/2015 | Sadek .............. | H04W 74/0816 |
| | | | 370/252 |
| 2016/0112898 A1* | 4/2016 | Chen ................ | H04W 28/0215 |
| | | | 370/235 |
| 2016/0127097 A1* | 5/2016 | Chen .................... | H04L 5/0051 |
| | | | 370/330 |
| 2016/0128055 A1* | 5/2016 | Xiong ................ | H04W 72/048 |
| | | | 370/329 |
| 2017/0093540 A1* | 3/2017 | Lei ........................ | H04L 5/0044 |
| 2017/0181124 A1* | 6/2017 | Zhu ...................... | H04L 5/0005 |
| 2017/0181135 A1* | 6/2017 | Chen .................. | H04W 72/042 |
| 2017/0223725 A1* | 8/2017 | Xiong .............. | H04W 72/1205 |
| 2017/0257264 A1* | 9/2017 | Liu .................... | H04L 41/0803 |

OTHER PUBLICATIONS

3GPP TSG-RAN WG1 #83 R1-157419, Ericsson, NB-IoT-DL Design, Anaheim, CA. USA dated Nov. 15-22, 2015 (11 pages).

3GPP TSG RAN WG1 Meeting #83 R1-156462, Huawei et al., NB-IoT-downlink physical layer concept description, Anaheim, CA. USA dated Nov. 15-22, 2015 (11 pages).

3GPP TSG RAN WG1 Meeting #80 R1-150060, Huawei et al., DL physical control channels for MTC, Athens, Greece dated Feb. 9-13, 2015 (4 pages).

3GPP TSG-RAN WG1 #82bis R1-156010, Ericsson et al., NB-LTE-General L1 Concept Description, Malmo, Sweden dated Oct. 5-9, 2015 (16 pages).

* cited by examiner

PRB PAIR OF NB-PDCCH

| NB-PDCCH FORMAT | Number of NCCEs per NB-PDCCH (Aggregation Level, AL) | Number of REs per NB-PDCCH |
|---|---|---|
| 0 | 1 | 72 |
| 1 | 2 | 144 |
| 2 | 4 | 288 |
| 3 | 8 | 576 |
| 4 | 16 | 1152 |

Rmax >= 8    In total 15 BDs

{AL, R, C}
- AL → aggregation level
- R → repetition number
- C → number of candidate AL=1 → half subframe
AL=2 → one subframe form, ask, ca, this, pg,, cool, love,,, love,.,.

PHYSICAL DOWNLINK CONTROL CHANNEL DESIGN FOR NARROW BAND INTERNET OF THINGS

CROSS REFERENCE TO RELATED APPLICATIONS

This application claims priority under 35 U.S.C. § 119 from U.S. Provisional Application No. 62/268,600 entitled "Physical Downlink Control Channel Design for Narrow Band Internet of Things," filed on Dec. 17, 2015, the subject matter of which is incorporated herein by reference.

TECHNICAL FIELD

The disclosed embodiments relate generally to physical downlink control channel (PDCCH), and, more particularly, to PDCCH design for Narrow Band Internet of Things (NB-IoT).

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for dynamic downlink scheduling. Typically, PDCCH can be configured to occupy the first one, two, or three OFDM symbols in a subframe.

One promising technology for LTE is the use of Multiple Input Multiple Output (MIMO) antennas that can further improve the spectral efficiency gain by using spatial division multiplexing. Multi-user MIMO (MU-MIMO) is considered in LTE Rel-10. To enable MU-MIMO, individual control signaling must be indicated to each UE via PDCCH. As a result, more PDCCH transmissions are expected, as the number of scheduled UEs per subframe will increase. However, the maximum 3-symbol PDCCH region may not be enough to accommodate the increased number of UEs in LTE. Due to limited control channel capacity, the MIMO performance degrades because of non-optimized MU-MIMO scheduling.

LTE-Advanced (LTE-A) system improves spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In a heterogeneous network (HetNet), smarter resource coordination among base stations, better base station selection strategies and more advance techniques for efficient interference management can provide substantial gains in throughput and user experience as compared to a conventional homogeneous network. For example, coordinated multiple points (CoMP) transmission/reception, also known as multi-BS/site MIMO, is used to enhance the performance of cell-edge UEs in LTE-Rel-11. CoMP creates a control channel capacity problem similar to the MU-MIMO situation illustrated above.

To address the control channel capacity problem, an UE-specific downlink scheduler for MU-MIMO/CoMP has been proposed. In LTE, it extends the PDCCH design to a new ePDCCH, which is in the legacy Physical Downlink Shared Channel (PDSCH). The main benefits to have this new physical control channel are for the better support of HetNet, CoMP, and MU-MIMO. Based on ePDCCH design spanning in both first and second slots in the region of legacy PDSCH, it is desirable to design the physical structure of ePDCCH to support both distributed and localized transmission to exploit either diversity or beamforming gain. In order to minimize the control overhead, resource utilization gain needs to be enhanced and multiplexing physical resource for both distributed and localized transmission of ePDCCH in one physical resource block (PRB) may be necessary.

Narrowband IoT (NB-IoT) is a Low Power Wide Area Network (LPWAN) radio technology standard that has been developed to enable a wide range of devices and services to be connected using cellular telecommunications bands. NB-IoT is a narrowband radio technology designed for the Internet of Things (IoT), and is one of a range of Mobile IoT (MIoT) technologies standardized by the 3GPP. The physical structure of physical downlink control channel for NB-IoT needs to be addressed.

SUMMARY

Narrowband downlink control channel (NB-PDCCH) design for Narrowband Internet of Thing (IoT) devices is proposed. In one novel aspect, NB-PDCCH spans both first and second slots in the region of legacy physical downlink shared channel (PDSCH). A plurality of physical resource blocks (PRBs) is allocated for NB-PDCCH transmission that carry downlink control information (DCI). Furthermore, each NB-IoT device can be configured with $n_{PRB}$ PRB pairs for NB-PDCCH transmission (e.g., $n_{PRB}$=1, 2, 4, or 8), and an NB-PDCCH transmission time interval (TTI) is composed by $n_{PRB}$ subframes. An NB-PDCCH is encoded and occupies multiple narrowband control channel elements (NCCEs) based on aggregation level. In a preferred embodiment, each PRB pair for NB-PDCCH occupies two NCCEs.

In one embodiment, a method of receiving and decoding downlink control information over NB-PDCCH by NB-IoT devices is disclosed. A UE receives a control signal to determine received physical resource blocks (PRBs) that carry downlink control information (DCI). The UE determines a set of candidate narrowband physical downlink control channels (NB-PDCCHs) within the PRBs, wherein each NB-PDCCH is associated with a set of narrowband control channel elements (NCCEs) for NB-PDCCH transmission. The UE collects a plurality of resource elements (REs) for each NCCE, wherein each NCCE consists of a number of REs based on an NCCE to RE de-mapping rule. The UE decodes the downlink control information (DCI) that are mapped to the collected REs.

In another embodiment, a method of encoding and transmitting downlink control information over NB-PDCCH for NB-IoT devices is disclosed. A communication device (e.g., serving base station) transmits a control signal. A set of physical resource blocks (PRBs) is allocated to carry downlink control information (DCI). The base station determines a set of candidate narrowband physical downlink control channels (NB-PDCCHs) within the PRBs. Each NB-PD-CCH is associated with a set of narrowband control channel elements (NCCEs) to potentially carry the DCI. The base station maps a plurality of resource elements (REs) to each NCCE based on an RE to NCCE mapping rule. The base station encodes the downlink control information over the set of NCCEs to be transmitted to a UE if the DCI is intended for the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
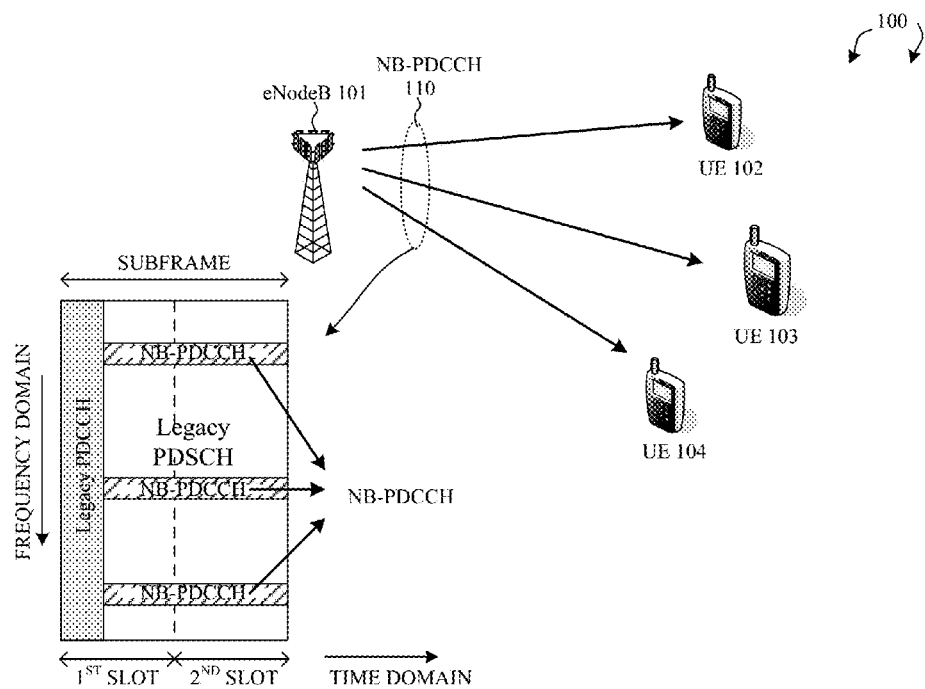
FIG. 1 illustrates a mobile communication network utilizing a narrowband physical downlink control channel (NB-PDCCH) in accordance with one novel aspect.

FIG. 1 illustrates a mobile communication network 100 utilizing a narrowband physical downlink control channel (NB-PDCCH) in accordance with one novel aspect. Mobile communication network 100 is an OFDM/OFDMA system comprising a base station eNodeB 101 and a plurality of user equipment UE 102, UE 103, and UE 104. When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI).

In the example of FIG. 1, a narrowband downlink control channel (NB-PDCCH) 110 is used for eNodeB 101 to send DCI to the UEs. In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots. In one novel aspect, NB-PDCCH 110 spans both first and second slots in the region of PRB pair. Furthermore, each UE can be configured with $n_{PRB}$ PRB pairs for NB-PDCCH transmission (e.g., $n_{PRB}$=1, 2, 4, or 8), and an NB-PDCCH transmission time interval (TTI) is composed by $n_{PRB}$ subframes. In the example of FIG. 1, NB-PDCCH 110 is encoded and occupies multiple narrowband control channel elements (NCCEs). REs are mapped to NCCE forming the logical unit to carry DCI.

Figure 2:
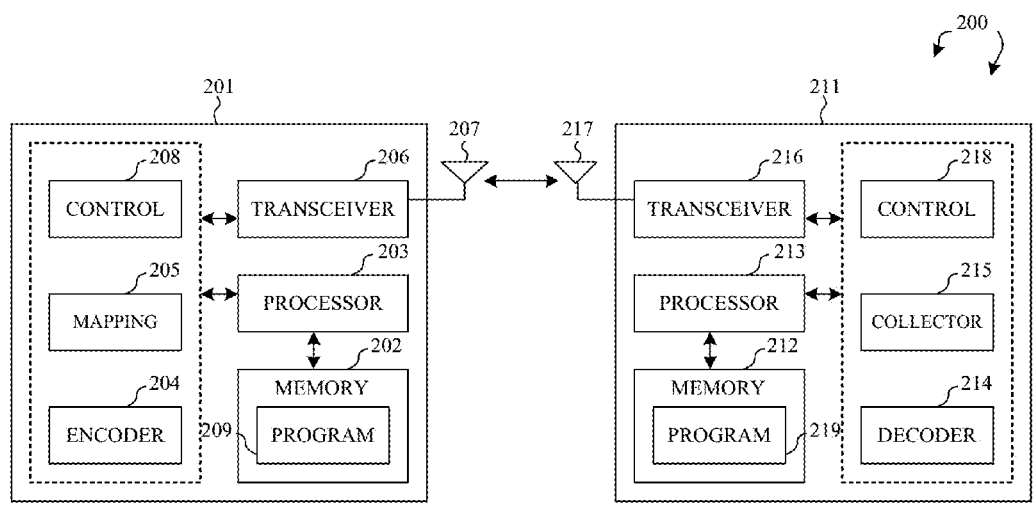
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules to carry out some embodiments of the present invention. The different functional modules can be implemented by software, firmware, hardware, or any combination thereof. The function modules, when executed by the processors 203 and 213 (e.g., via executing program codes 209 and 219), for example, allow base station 201 to encode and transmit downlink control information to UE 211, and allow UE 211 to receive and decode the downlink control information accordingly. In one example, base station 201 configures a set of radio resource for NB-PDCCH transmission via control module 208 and maps the downlink control information to the configured REs via mapping module 205. The downlink control information carried in NB-PDCCH is then modulated and encoded via encoder 204 to be transmitted by transceiver 206 via antenna 207. UE 211 receives the downlink control information by transceiver 216 via antenna 217. UE 211 determines the configured radio resource for NB-PDCCH transmission via control module 218 and collects the configured REs via collector 215. UE 211 then demodulates and decodes the downlink information from the collected REs via decoder 214.

The physical structure of NB-PDCCH can be two levels. Two levels of physical structure are defined for better diversity for both distributed and localized transmission in PB-PDCCH. First level is a physical unit of narrowband resource element groups (NREGs), where the group of REs is predefined for each NREG. The NREGs can be either localized or distributed within a PRB or PRB pair. Second level is a logical unit of narrowband control channel elements (NCCEs), where the group of NREGs is predefined or configurable by higher layer for each NCCE. The downlink control information is transmitted on a number of aggregated NCCEs according to the modulation and coding level required.

In the two-level physical structure, NCCE consists of several NREGs, which can be in either single PRB or multiple PRBs. For distributed transmission of NB-PDCCH, NCCE consists of several NREGs that are distributed in multiple non-contiguous PRBs spreading over the whole channel frequency so that frequency diversity gain can be maximally exploited using distributed NCCE structure. For localized transmission of NB-PDCCH, NCCE consists of several NREGs that are uniformly distributed in single PRB so that it facilitates uniform utilization of reference signals inside one PRB for better robustness in channel estimation. If the NREGs of an NCCE locate in a localized area inside one PRB, the channel estimation will heavily depend on the reference signals nearby the NREGs so channel estimation performance will largely degrade if those reference signals are interfered. Uniformly distributed NREGs can mitigate such effect.

To simplify design, the physical structure of NB-PDCCH can also be one level. In a one-level physical structure, the concept of NREG is eliminated. The one level is a logical unit of narrowband control channel elements (NCCEs), where the group of REs is predefined or configurable by higher layer for each NCCE. The downlink control information is transmitted on a number of aggregated NCCEs according to the modulation and coding level required.

Figures 3, 4:
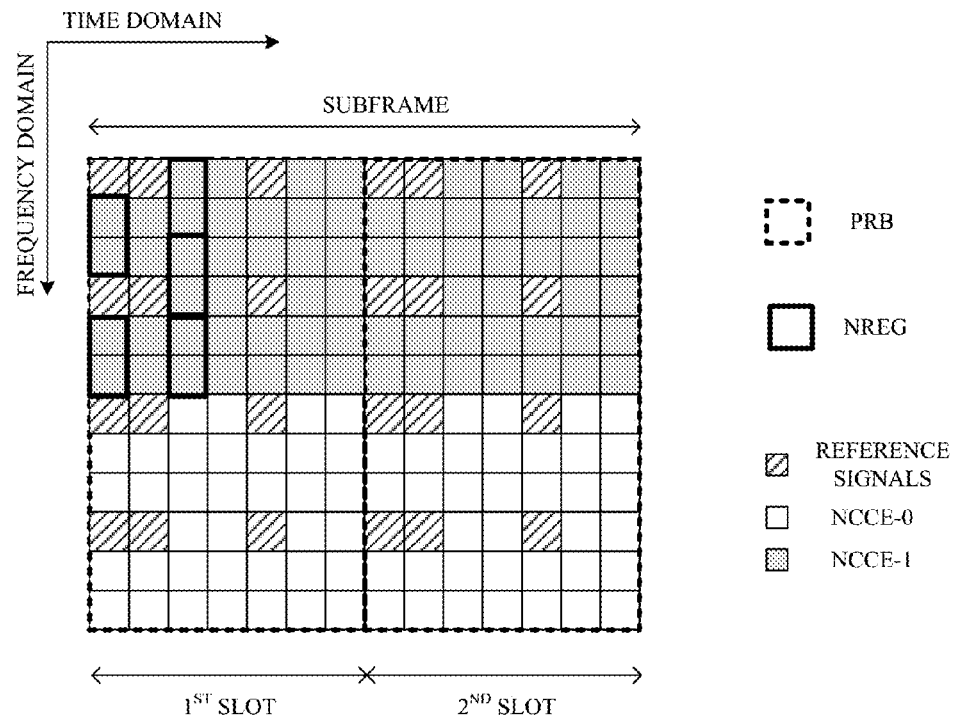
FIG. 3 illustrates one example of a physical structure of NB-PDCCH and narrowband control channel elements (NCCEs) with localized narrowband resource element group (NREG) or resource element (RE) to NCCE mapping.
FIG. 4 illustrates examples different NB-PDCCH format with corresponding number of NCCEs per NB-PDCCH and number of REs per NB-PDCCH.

FIG. 3 illustrates one example of a physical structure of NB-PDCCH and narrowband control channel elements (NCCEs) with localized NREG and localized NREG/RE to NCCE mapping. As illustrated in FIG. 3, NB-PDCCH is allocated within one PRB or PRB pair having a plurality of reference elements (REs). REs are allocated for either data or reference signals, such as cell-specific reference signals (CRS), UE-specific reference signals (DM-RS), and channel state information reference signals (CSI-RS). NREG is a group of physically contiguous REs. In FIG. 3, one NREG consists of two contiguous REs. For example, two adjacent REs for 2TX space frequency block coding (SFBC) is grouped as the NREG. Further, one NCCE consists of multiple NREGs that are uniformly distributed in the single PRB. For example, 1NCCE=36NREGs=72REs. For one-level physical structure, the concept of NREG is eliminated, and NCCE is mapped from REs directly. In a preferred embodiment, each PRB pair for NB-PDCCH occupies two NCCEs. Specifically, the allocated PRB for NB-PDCCH is divided into two portions along frequency domain. The REs belonging to the bottom half of subcarriers are mapped to NCCE-0, and the REs belonging to the top half of the subcarriers are mapping to NCCE-1.

FIG. 4 illustrates examples of different NB-PDCCH formats with corresponding number of NCCEs per NB-PDCCH and number of REs per NB-PDCCH. A UE can be configured with $n_{PRB}$ PRB pairs for NB-PDCCH transmission (e.g., $n_{PRB}$=1, 2, 4, or 8), and an NB-PDCCH transmission time interval (TTI) is composed by $n_{PRB}$ subframes. Each NB-PDCCH is encoded and occupies multiple NCCEs. As depicted by table 400 of FIG. 4, there are many possible NB-PDCCH formats can be used. For NB-PDCCH Format 0, each NB-PDCCH occupies one NCCE, e.g., the aggregation level AL=1, and the number of REs per NB-PDCCH is 72. For NB-PDCCH Format 1, each NB-PDCCH occupies two NCCEs, e.g., the aggregation level AL=2, and the number of REs per NB-PDCCH is 144. For NB-PDCCH Format 2, each NB-PDCCH occupies four NCCEs, e.g., the aggregation level AL=4, and the number of REs per NB-PDCCH is 288. For NB-PDCCH Format 3, each NB-PDCCH occupies eight NCCEs, e.g., the aggregation level AL=8, and the number of REs per NB-PDCCH is 576. For NB-PDCCH Format 4, each NB-PDCCH occupies 16 NCCEs, e.g., the aggregation level AL=16, and the number of REs per NB-PDCCH is 1152. Note that the repetition number R is further defined for the NB-PDCCH TTI repetition.

Figure 5:
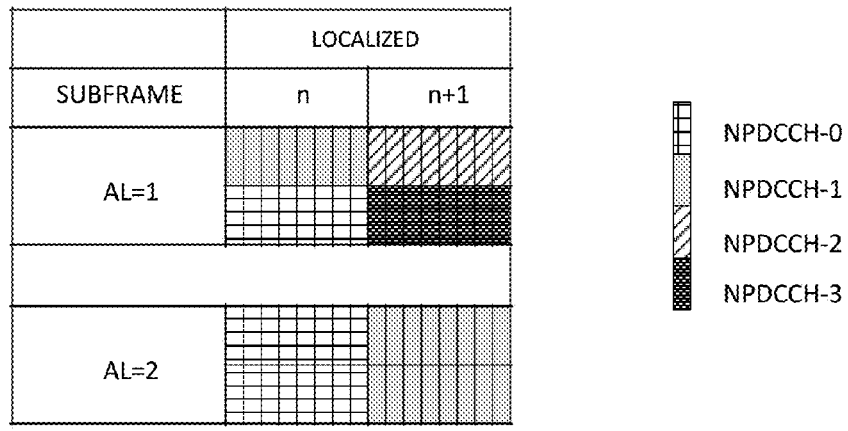
FIG. 5 illustrates a first example of NCCE to NB-PDCCH mapping with two PRBs.

FIG. 5 illustrates a first example of NCCE to NB-PDCCH mapping with two PRBs. In the example of FIG. 5, the UE is configured with two PRB pairs, and an NB-PDCCH TTI is composed by two subframes n and n+1. For NB-PDCCH Format 1, the aggregation level AL=1, which means that each NB-PDCCH occupies one NCCE, and each NCCE occupies half subframe divided along frequency domain of subcarriers. There is a total of four candidate NB-PDCCHs (NB-PDCCH-0, NB-PDCCH-1, NB-PDCCH-2, and NB-PDCCH-3) in subframes n and n+1 as depicted in FIG. 5 with different shaded areas. For NB-PDCCH Format 2, the aggregation level AL=2, which means that each NB-PDCCH occupies two NCCEs, and the two NCCEs occupies the entire subframe. There is a total of two candidate NB-PDCCHs (NB-PDCCH-0 and NB-PDCCH-1) in subframes n and n+1 as depicted in FIG. 5 with different shaded areas.

Figure 6:
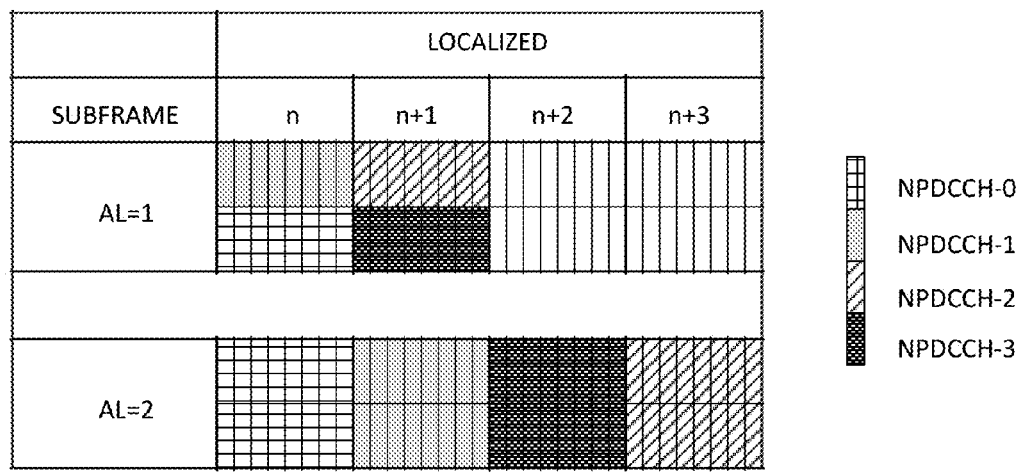
FIG. 6 illustrates a second example of NCCE to NB-PDCCH mapping with four PRBs.

FIG. 6 illustrates a second example of NCCE to NB-PDCCH mapping with four PRBs. In the example of FIG. 6, the UE is configured with four PRB pairs, and an NB-PDCCH TTI is composed by four subframes n, n+1, n+2, and n+3. For NB-PDCCH Format 1, the aggregation level AL=1, which means that each NB-PDCCH occupies one NCCE, and each NCCE occupies half subframe divided along frequency domain of subcarriers. There is a total of four candidate NB-PDCCHs (NB-PDCCH-0, NB-PDCCH-1, NB-PDCCH-2, and NB-PDCCH-3) in subframes n and n+1 as depicted in top of FIG. 6 with different shaded areas. For NB-PDCCH Format 2, the aggregation level AL=2, which means that each NB-PDCCH occupies two NCCEs, and the two NCCEs occupies the entire subframe. There is a total of four candidate NB-PDCCHs (NB-PDCCH-0, NB-PDCCH-1, NB-PDCCH-2, and NB-PDCCH-3) in subframes n, n+1, n+2, and n+3 as depicted in bottom of FIG. 6 with different shaded areas.

In order to decode NB-PDCCH targeted specifically to a UE, the UE needs to find out where its NB-PDCCH is. In the so-called "blindly" decoding process, the UE must try a number of candidate NB-PDCCHs before knowing which NB-PDCCH is targeted for itself. The allocated radio resources of the candidate NB-PDCCHs may be distributed or localized. In addition, the NB-PDCCHs may constitute a common search space (CSS) or a UE-specific search space (UESS). As a result, the aggregated radio resources of candidate NB-PDCCHs for different UEs may be different. In other words, NB-PDCCH may be UE-specific and it is beneficial for blind decoding. With UE-specific NB-PDCCH, the size of search space for each UE can be reduced for smaller number of blind decoding candidates without affecting block rate of downlink schedulers and uplink grants so that UE can enjoy shorter processing time of DCI detection.

Figure 7:
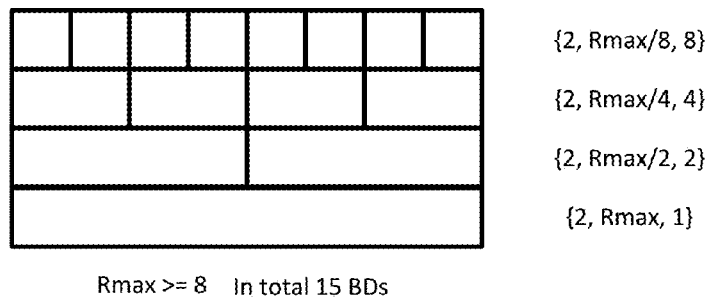
FIG. 7 illustrates one example of NB-PDCCH search space for NB-IoT devices.

FIG. 7 illustrates one example of NB-PDCCH search space for NB-IoT devices. In the example of FIG. 7, the allocated radio resources of the candidate NB-PDCCHs constitute UE-specific search space. In addition, the NB-PDCCH is of localized type, where the radio resources employed by a localized-type NB-PDCCH are within one or a contiguous set of PRBs. The UE-specific NB-PDCCH search space can be represented by a set of parameters {AL, R, C}. Parameter AL indicates the aggregation level, e.g., the number of NCCEs per NB-PDCCH. If AL=1, then it means that each NB-PDCCH occupies half subframe. If AL=2, then it means that each NB-PDCCH occupies one subframe. Parameter R indicates the repetition number of NB-PDCCH TTI repetition. Parameter C indicates the number of candidate NB-PDCCHs in the search space. In FIG. 7, four possible search spaces can be represented by {2, Rmax/8, 8}, {2, Rmax/4, 4}, {2, Rmax/2, 2}, and {2, Rmax, 1}, where Rmax>=8 in total 15 blind decoding.

Figure 8:
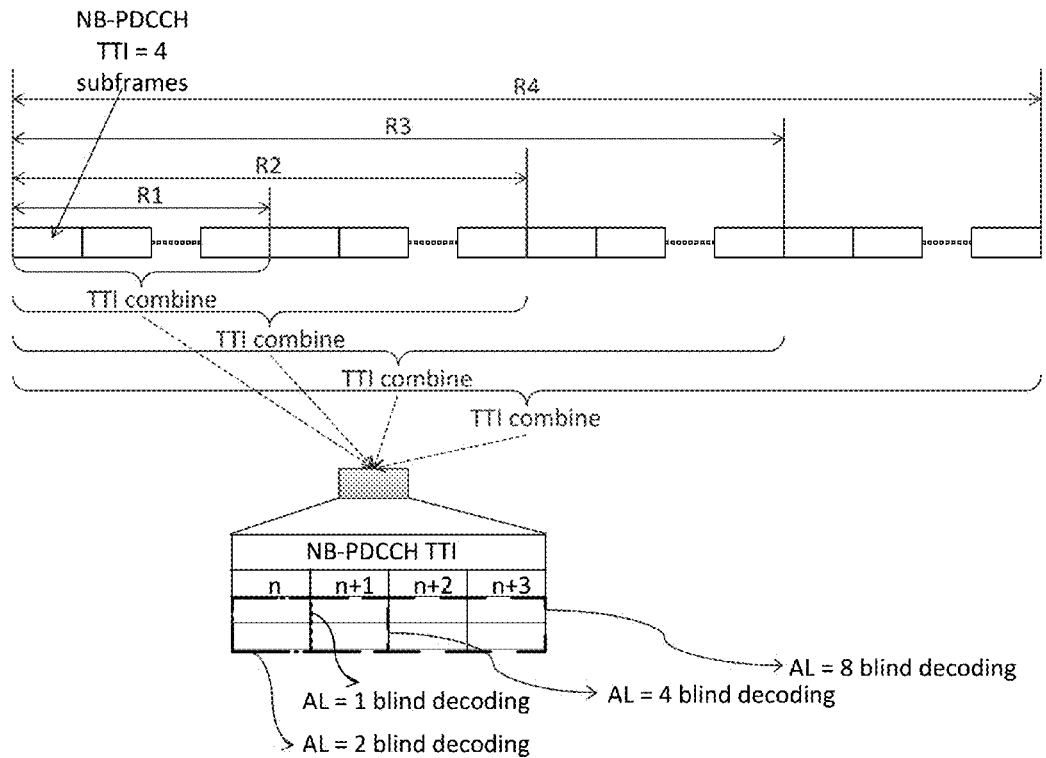
FIG. 8 illustrates one example for NB-PDCCH blind decoding based on NB-PDCCH search space.

FIG. 8 illustrates one example for NB-PDCCH blind decoding based on NB-PDCCH search space. In the example of FIG. 8, UE is configured with four PRB pairs, and an NB-PDCCH TTI is composed by four subframes n, n+1, n+2, and n+3. First, UE determines the PRBs or PRB pairs that are configured for NB-PDCCH transmission based on signaling from the base station. The signaling can be dynamic signaling (layer 1 signaling), semi-static signaling (RRC signaling), system information, or any combination thereof. UE decodes the signaling to determine the PRBs or PRB pairs allocated for NB-PDCCH transmission. Next, the UE follows a predefined or configured partitioning rule to partition each PRB into multiple NCCE and then determine the logical address of each NCCE. Next, the UE follows another predefined or configured aggregation rule to aggregate multiple NCCEs to a single candidate NB-PDCCH. Because the downlink control information is transmitted on one or more logical NCCEs by the base station, the UE can decode the downlink control information based on the logical address of the NCCEs.

Figure 9:
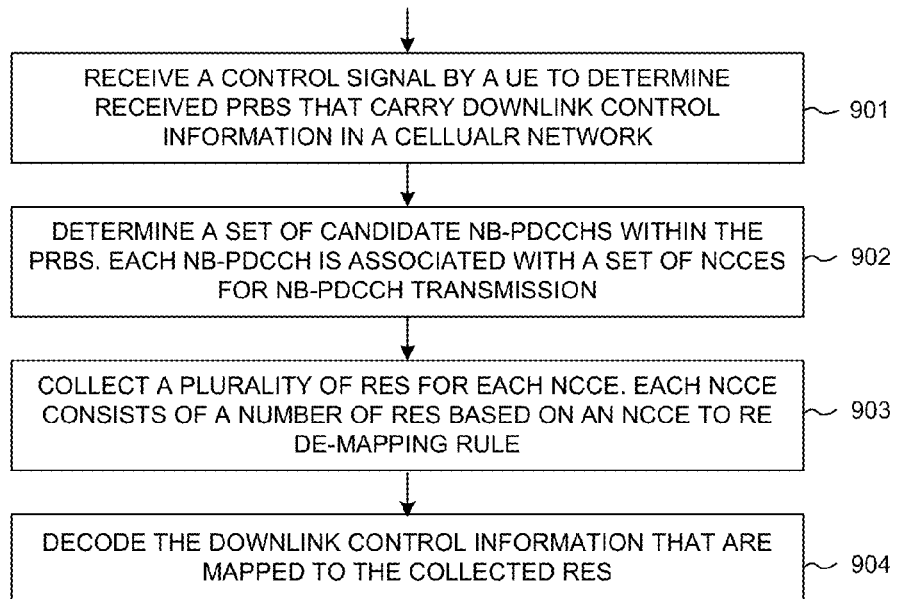
FIG. 9 is a flow chart of a method of receiving and decoding downlink control information over NB-PDCCH by NB-IoT devices in accordance with one novel aspect.

FIG. 9 is a flow chart of a method of receiving and decoding downlink control information over NB-PDCCH by NB-IoT devices in accordance with one novel aspect. In step 901, a UE receives a control signal to determine received physical resource blocks (PRBs) that carry downlink control information (DCI). In step 902, the UE determines a set of candidate narrowband physical downlink control channels (NB-PDCCHs) within the PRBs, wherein each NB-PDCCH is associated with a set of narrowband control channel elements (NCCEs) for NB-PDCCH transmission. In step 903, the UE collects a plurality of resource elements (REs) for each NCCE, wherein each NCCE consists of a number of REs based on an NCCE to RE de-mapping rule. Finally, in step 904, the UE decodes the downlink control information (DCI) that are mapped to the collected REs.

Figure 10:
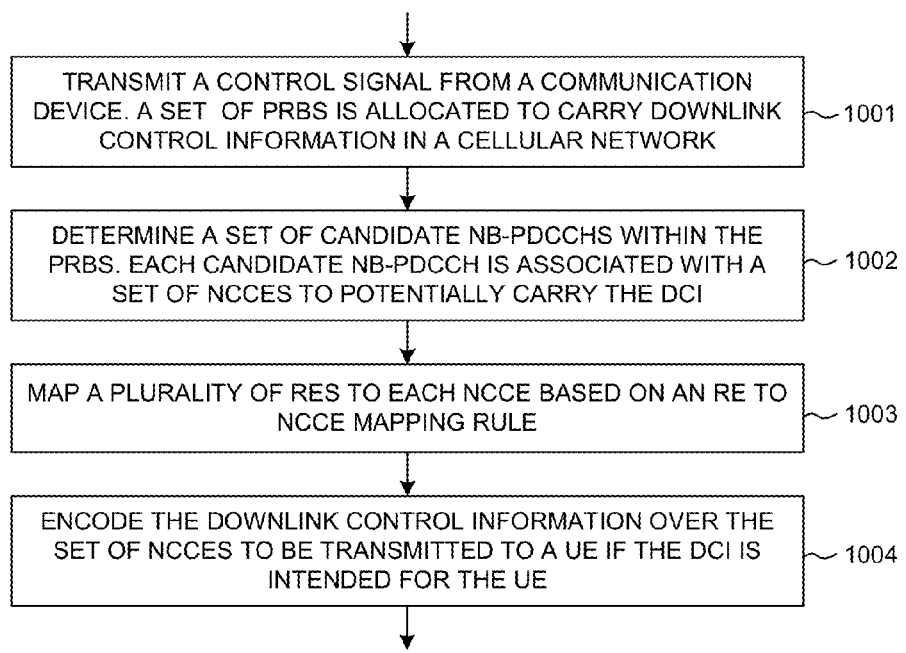
FIG. 10 is a flow chart of a method of encoding and transmitting downlink control information over NB-PDCCH for NB-IoT devices in accordance with one novel aspect.

FIG. 10 is a flow chart of a method of encoding and transmitting downlink control information over NB-PDCCH for NB-IoT devices in accordance with one novel aspect. In step 1001, a communication device transmits a control signal. A set of physical resource blocks (PRBs) is allocated to carry downlink control information (DCI). In step 1002, the base station determines a set of candidate narrowband physical downlink control channels (NB-PDCCHs) within the PRBs. Each NB-PDCCH is associated with a set of narrowband control channel elements (NCCEs) to potentially carry the DCI. In step 1003, the base station maps a plurality of resource elements (REs) to each NCCE based on an RE to NCCE mapping rule. In step 1004, the base station encodes the DCI over the set of NCCEs to be transmitted to a UE if the DCI is intended for the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a control signal by a user equipment (UE) to determine received physical resource blocks (PRBs) that carry downlink control information;
   determining a set of candidate narrowband physical downlink control channels (NB-PDCCHs) within the PRBs, wherein each NB-PDCCH is associated with a set of narrowband control channel elements (NCCEs) for NB-PDCCH transmission;
   collecting a plurality of resource elements (REs) for each NCCE, wherein each NCCE consists of a number of REs based on an NCCE to RE de-mapping rule, wherein one PRB is allocated for one NB-PDCCH having two NCCEs, wherein a first NCCE of the PRB is mapped to REs belonging to a first plurality of contiguous subcarriers of the PRB, and wherein a second NCCE of the PRB is mapped to REs belonging to a second plurality of contiguous subcarriers of the PRB; and
   decoding the downlink control information that are mapped to the collected REs.

2. The method of claim 1, wherein the collected REs for each NCCE are physically contiguous REs excluding REs allocated for NB-PDCCH demodulation reference signal transmission within a block of physically contiguous radio resources.

3. The method of claim 2, wherein the NB-PDCCH demodulation reference signal is a cell specific reference signal (CRS).

4. The method of claim 1, wherein the UE decodes the downlink control information in a single NCCE per NB-PDCCH transmission.

5. The method of claim 1, wherein the UE decodes the downlink control information in a plurality of NCCEs per NB-PDCCH transmission.

6. The method of claim 1, wherein the control signal defines a UE search space for the PRBs that carry the downlink control information.

7. A user equipment (UE) comprising:
   a receiver that receives a control signal to determine received physical resource blocks (PRBs) that carry downlink control information in a cellular network;
   a controller that determines a set of candidate narrowband physical downlink control channels (NB-PDCCHs) within the PRBs, wherein each NB-PDCCH is associated with a set of narrowband control channel elements (NCCEs) for NB-PDCCH transmission;
   a collector that collects a plurality of resource elements (REs) for each NCCE, wherein each NCCE consists of a number of REs based on an NCCE to RE de-mapping rule, wherein one PRB is allocated for one NB-PDCCH having two NCCEs, wherein a first NCCE of the PRB is mapped to REs belonging to a first plurality of contiguous subcarriers of the PRB, and wherein a second NCCE of the PRB is mapped to REs belonging to a second plurality of contiguous subcarriers of the PRB; and a decoder that decodes the downlink control information that are mapped to the collected REs.

8. The UE of claim 7, wherein the collected REs for each NCCE are physically contiguous REs excluding REs allocated for NB-PDCCH demodulation reference signal transmission within a block of physically contiguous radio resources.

9. The UE of claim 8, wherein the NB-PDCCH demodulation reference signal is a cell specific reference signal (CRS).

10. The UE of claim 7, wherein the UE decodes the downlink control information in a single NCCE per NB-PDCCH transmission.

11. The UE of claim 7, wherein the UE decodes the downlink control information in a plurality of NCCEs per NB-PDCCH transmission.

12. The UE of claim 7, wherein the control signal defines a UE search space for the PRBs that carry the downlink control information.

13. A method comprising:
transmitting a control signal from a communication device, wherein a set of physical resource blocks (PRBs) is allocated to carry downlink control information (DCI);

determining a set of candidate narrowband physical downlink control channels (NB-PDCCHs) within the PRBs, wherein each NB-PDCCH is associated with a set of narrowband control channel elements (NCCEs) to potentially carry the DCI;

mapping a plurality of resource elements (REs) to each NCCE based on an RE to NCCE mapping rule, wherein one PRB is allocated for one NB-PDCCH having two NCCEs, wherein a first NCCE of the PRB is mapped to REs belonging to a first plurality of contiguous subcarriers of the PRB, and wherein a second NCCE of the PRB is mapped to REs belonging to a second plurality of contiguous subcarriers of the PRB; and encoding the DCI over the set of NCCEs to be transmitted to a UE if the DCI is intended for the UE.

14. The method of claim 13, wherein the downlink control information is carried in a single NCCE per NB-PDCCH transmission.

15. The method of claim 13, wherein the downlink control information is carried in a plurality of NCCEs per NB-PDCCH transmission.

16. The method of claim 13, wherein the control signal defines a UE search space for the PRBs that carry the downlink control information.

17. The method of claim 16, wherein the UE search space is defined by an aggregation level of NCCEs per NB-PDCCH, a repetition number for NB-PDCCH transmission time interval (TTI) repetition, and a number of candidate NB-PDCCHs.

* * * * *